US007892330B2

(12) United States Patent
Kusunoki

(10) Patent No.: US 7,892,330 B2
(45) Date of Patent: Feb. 22, 2011

(54) IMAGE FORMING APPARATUS

(75) Inventor: Naoki Kusunoki, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 941 days.

(21) Appl. No.: 11/783,725

(22) Filed: Apr. 11, 2007

(65) Prior Publication Data

US 2007/0258726 A1 Nov. 8, 2007

(30) Foreign Application Priority Data

Apr. 12, 2006 (JP) ............................ 2006-109999

(51) Int. Cl.
*B01D 19/00* (2006.01)

(52) U.S. Cl. .......................... 96/156; 55/385.1; 96/219; 347/92; 347/93

(58) Field of Classification Search ................ 55/385.1, 55/429, 323, 329, 392, DIG. 34; 96/111, 96/117, 399, 413, 417, 421, 219, 157, 155, 96/156; 355/316, 205, 206, 207; 95/1, 19; 73/28.01, 28.03, 31.03, 31.04; 347/85-87, 347/92, 93; 116/266, DIG. 25
See application file for complete search history.

(56) References Cited

U.S. PATENT DOCUMENTS 6,723,147 B2 * 4/2004 Mashiko et al. ............ 55/385.1
6,799,843 B2 * 10/2004 Okamoto ..................... 347/86
6,830,321 B2 * 12/2004 Okamoto et al. .............. 347/86
6,837,921 B2 * 1/2005 Inoue et al. ...................... 96/6
6,984,252 B2 * 1/2006 Tanimoto ................... 55/385.1
7,207,671 B2 * 4/2007 Morris et al. ............... 347/108
7,252,378 B2 * 8/2007 Lee ............................ 347/87
7,468,099 B2 * 12/2008 Katayama .................... 96/135
2002/0063761 A1 5/2002 Sato et al.

FOREIGN PATENT DOCUMENTS

JP 2002-86747 A 3/2002
JP 2002-240323 A 8/2002

* cited by examiner

*Primary Examiner*—Duane Smith
*Assistant Examiner*—Minh-Chau Pham
(74) *Attorney, Agent, or Firm*—Birch, Stewart, Kolasch & Birch, LLP

(57) ABSTRACT

The image forming apparatus includes: a head which ejects droplets of liquid in accordance with an image signal; a sub tank which is integrated with the head; a liquid holding chamber which is arranged in the sub tank and has an intake port and an outflow port, the liquid being supplied to the liquid holding chamber through the intake port and supplied to the head through the outflow port; an air connection channel which is arranged in the sub tank and has a suction port through which air is sucked; a dividing plate which is provided in the sub tank and divides the liquid holding chamber from the air connection channel; a gas/liquid separating member which is disposed in a portion of the dividing plate and allows only air to pass between the liquid holding chamber and the air connection channel; a supply connection device which is capable of connecting with the intake port and the suction port; a liquid holding tank which is connected to the supply connection device and capable of communicating with the liquid holding chamber through the intake port; a suction device which is connected to the supply connection device and capable of communicating with the air connection channel through the suction port; and a judgment device which judges whether or not replacement of the gas/liquid separating member is required in accordance with a state of contact between the gas/liquid separating member and a surface of the liquid in the liquid holding chamber.

16 Claims, 9 Drawing Sheets

IMAGE FORMING APPARATUS

BACKGROUND OF THE INVENTION

1. Field of the Invention

The present invention relates to an image forming apparatus, and more particularly to an image forming apparatus having a serial head fitted with a sub tank which connects to an ink supply main tank.

2. Description of the Related Art

Among image forming apparatuses using a serial head, which moves reciprocally in a direction perpendicular to the conveyance direction of paper while ejecting ink toward the paper, there are image forming apparatuses that perform printing by scanning the paper with the serial head that is integrated with an ink supply sub tank having the capacity limited to the minimum necessary capacity. In an image forming apparatus of this kind, the sub tank is connected through an intake port to a main tank, which is provided separately, when the ink is supplied from the main tank to the sub tank.

An image forming apparatus of this kind is disclosed in Japanese Patent Application Publication Nos. 2002-086747 and 2002-240323. FIG. 9 is an approximate oblique drawing of a sub tank 101, which forms a liquid storage vessel disclosed in Japanese Patent Application Publication No. 2002-086747. As shown in FIG. 9, the sub tank 101 is provided with an ink supply needle 102 of an ink intake port, an ink supply channel 103, a lid member 104, a gas/liquid separating member 105 having fine apertures 107, an air intake port 106, and the like.

The sub tank 101 having a composition of this kind has the following function. When supplying ink, ink is supplied from the needle 102 by means of a negative suction pressure created by a pump, or the like, connected to the air intake port 106. The suction pressure of the pump is adjusted in such a manner that the ink supply is halted by the action of the non-wetting material coating the gas/liquid separating member 105 and the meniscus force created in the fine apertures 107 when the ink supply progresses and the position of the surface (the interface with the atmosphere) of the ink reaches the gas/liquid separating member 105 at the upper surface of the sub tank 101. Thereupon, as ink is ejected during printing, the ink inside the sub tank 101 is gradually consumed, and the ink level gradually declines. At a suitable timing, ink is then supplied through the needle 102.

In Japanese Patent Application Publication No. 2002-086747, it is explained that decline in the functional performance of the gas/liquid separating member 105 is prevented and the durability of this member is improved, due to the action of the non-wetting material coating the gas/liquid separating member 105.

Japanese Patent Application Publication No. 2002-240323 discloses a sub tank which is similar to that of Japanese Patent Application Publication No. 2002-086747. In Japanese Patent Application Publication No. 2002-240323, it is explained that the concentration of surfactant in ink is adjusted so as to prevent the ink from entering into the fine apertures of the gas/liquid separating member, and decline in the functional performance of the gas/liquid separating member is thereby prevented and the durability of this member is thus improved.

In Japanese Patent Application Publication Nos. 2002-086747 and 2002-240323, it is explained that the durability of the gas/liquid separating member 105 is improved and the lifespan of the gas/liquid separating member 105 before replacement is increased; however, the gas/liquid separating member 105 still has a short lifespan compared to that of the printer, and still needs to be replaced periodically. Hence, if the gas/liquid separating member 105 is not replaced at the time that such replacement has become necessary, then the ink enters into the fine apertures 107, and the like, of the gas/liquid separating member 105, thereby forming menis-cuses, and the fine apertures 107 may become sealed off due to the effects of the surfactant contained in the ink. Consequently, there is a risk that the functional performance of the gas/liquid separating member 105 may decline, making it more difficult to supply ink to the sub tank, among other problems.

Moreover, functional decline in the gas/liquid separating member 105 is difficult to recognize from external observation of the image forming apparatus, and it is difficult for the user to judge whether or not the time for replacement of the gas/liquid separating member 105 has been reached.

SUMMARY OF THE INVENTION

The present invention has been contrived in view of the foregoing circumstances, an object thereof being to provide an image forming apparatus which is capable of preventing problems caused by functional decline in a gas/liquid separating member, by accurately judging the time at which replacement of the gas/liquid separating member is necessary.

In order to attain the aforementioned object, the present invention is directed to an image forming apparatus, comprising: a head which ejects droplets of liquid in accordance with an image signal; a sub tank which is integrated with the head; a liquid holding chamber which is arranged in the sub tank and has an intake port and an outflow port, the liquid being supplied to the liquid holding chamber through the intake port and supplied to the head through the outflow port; an air connection channel which is arranged in the sub tank and has a suction port through which air is sucked; a dividing plate which is provided in the sub tank and divides the liquid holding chamber from the air connection channel; a gas/liquid separating member which is disposed in a portion of the dividing plate and allows only air to pass between the liquid holding chamber and the air connection channel; a supply connection device which is capable of connecting with the intake port and the suction port; a liquid holding tank which is connected to the supply connection device and capable of communicating with the liquid holding chamber through the intake port; a suction device which is connected to the supply connection device and capable of communicating with the air connection channel through the suction port; and a judgment device which judges whether or not replacement of the gas/liquid separating member is required in accordance with a state of contact between the gas/liquid separating member and a surface of the liquid in the liquid holding chamber.

According to this aspect of the present invention, since the requirement for replacement of the gas/liquid separating member is judged on the basis of the state of contact between the gas/liquid separating member and the surface of the liquid in the liquid holding chamber, then it is possible to accurately determine the replacement time for the gas/liquid separating member. Consequently, by replacing the gas/liquid separating member with a new one, at the appropriate replacement time, it is possible to prevent problems, such as decline in the functional performance of the gas/liquid separating member.

Preferably, the judgment device judges whether or not replacement of the gas/liquid separating member is required in accordance with at least one of a duration of contact between the liquid surface and the gas/liquid separating member and a number of occurrences of the contact between the liquid surface and the gas/liquid separating member.

According to this aspect of the present invention, since the requirement for replacement of the gas/liquid separating member is judged on the basis of the number of occurrences of the contact between the gas/liquid separating member and the surface of the liquid in the liquid holding chamber or the duration of the contact, it is possible to determine the replacement time of the gas/liquid separating member more accurately.

Preferably, the judgment device judges whether or not replacement of the gas/liquid separating member is required in accordance with at least one of a surface tension of the liquid and a particle diameter of insoluble particles dispersed in the liquid.

According to this aspect of the present invention, since the judgment device judges the requirement for replacement of the gas/liquid separating member in consideration of the surface tension of the liquid and/or the particle size of the insoluble particles dispersed in the liquid, then it is possible to determine the replacement time for the gas/liquid separating member more accurately, by taking account of the properties of the liquid.

Preferably, the judgment device judges whether or not replacement of the gas/liquid separating member is required in accordance with at least one of a comparison between the duration of the contact and a contact duration threshold value, and a comparison between the number of occurrences of the contact and a contact occurrence threshold number.

According to this aspect of the present invention, by setting the threshold values corresponding to the replacement time of the gas/liquid separating member, it is possible to determine the replacement time for the gas/liquid separating member more accurately. It is desirable that the material of the gas/liquid separating member, the type of ink, the suction pump capacity, and the like, should be taken into account when setting the threshold values. Moreover, by also incorporating the properties of the liquid as factors for setting the threshold values, it is possible to determine the replacement time for the gas/liquid separating member more accurately, while taking account of the properties of the liquid.

Preferably, the liquid includes inks of colors, and the judgment device judges whether or not replacement of the gas/liquid separating member is required for each of the inks.

According to this aspect of the present invention, since the judgment is made for the inks of respective colors, it is possible to accurately determine the replacement time for the gas/liquid separating member, in accordance with differences in the replacement times of the ink, due to variations in the physical values of the inks of respective colors, and variations in the use frequency of same.

According to the present invention, by accurately judging the time at which replacement of the gas/liquid separating member is necessary, it is possible to prevent the problem of decline in the functional performance of a gas/liquid separating member.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Description of Ink Supply System

Figure 1:
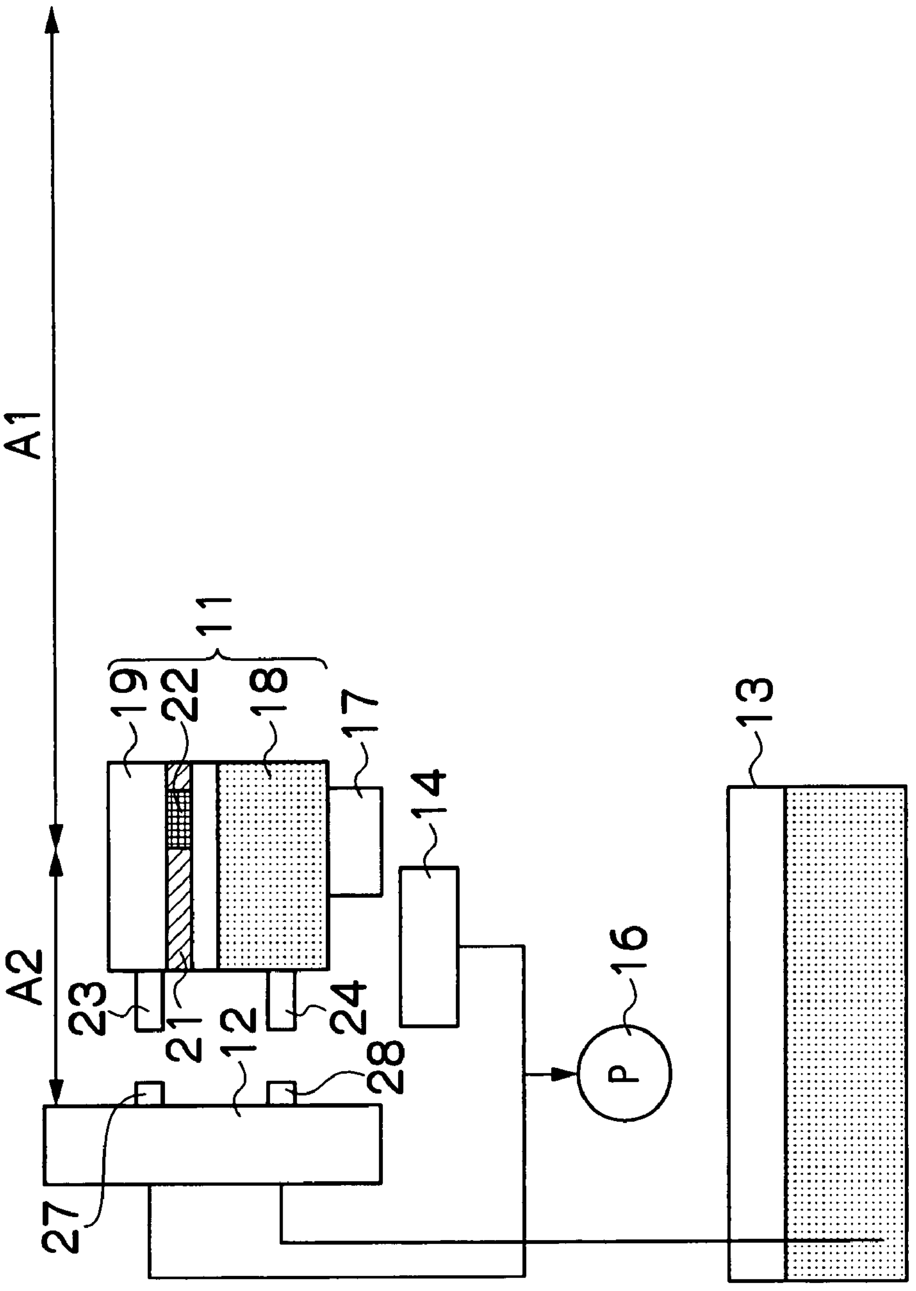
FIG. 1 is a general schematic drawing of an ink supply system which uses a gas/liquid separating member according to an embodiment of the present invention.

FIG. 1 is a general schematic drawing of an ink supply system that uses a gas/liquid separating member according to an embodiment of the present invention. Here, the gas/liquid separating member is a member that is disposed in a sub tank constituting a part of the ink supply system and has the function of allowing gas to pass and impeding the passage of liquid.

As shown in FIG. 1, the ink supply system includes a sub tank 11, a coupling unit 12, a main tank 13, a cap unit 14, a suction pump 16, and a head 17.

The head 17 is coupled integrally with the sub tank 11. During printing, the head 17 ejects droplets of ink from ejection ports or nozzles toward a recording medium (not shown) in accordance with an image signal, while scanning reciprocally back and forth the recording medium over a scanning print region A1 such as that shown in FIG. 1, and forms an image on the recording medium. The sub tank 11 is constituted by an ink holding section 18 and an air connection channel 19. The ink holding section 18 serves as a liquid holding chamber for holding ink. The air connection channel 19 provides a connection path to the air. A dividing plate 21 is interposed at the boundary between the ink holding section 18 and the air connection channel 19. The ink holding sections 18 are provided for the inks of respective colors. The ink holding section 18 of each color holds a relatively small quantity of ink, corresponding to an amount for printing images on several sheets or several tens of sheets.

The dividing plate 21 has a connection port, in which a gas/liquid separating member 22 is arranged. The gas/liquid separating member 22 allows only gas or air to pass and impedes the passage of liquid or ink. The surface of the gas/liquid separating member 22 on the side adjacent to the ink holding section 18 is coated with a non-wetting material. A plurality of fine apertures are formed in the gas/liquid separating member 22, in such a manner that gas can pass through same, and these fine apertures are formed by laser processing using irradiation of laser light. Alternatively, it is also possible that the gas/liquid separating member 22 is formed of a multi-fiber body laminated and calcined from a fibrous resin, metal, or the like.

The air connection channel 19 has a suction port 23, through which air is sucked from the exterior. The ink holding section 18 has an intake port 24, through which ink is supplied from the exterior. It is preferable that the ink holding section 18 is filled with an ink holding member (such as a sponge), so that the negative pressure of the head 17 can be controlled with a very high degree of accuracy.

The coupling unit 12 serves as a supply connection device, and has joints 27 and 28. The joint 27 is connected to a suction pump 16, which serves as a suction device. The joint 28 is connected to a main tank 13, which serves as a liquid storage tank. Each of the joints 27 and 28 is provided with a valve (not shown). The cap unit 14 suctions and expels ink from the ejection ports of the head 17, by introducing a negative pressure inside the cap unit 14 from a pump cylinder (not shown) through a suction tube (not shown). An outflow port (not shown) is provided between the ink holding section 18 and the head 17.

Figure 2A:
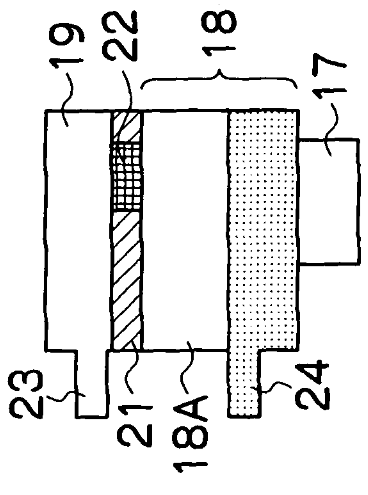
FIGS. 2A to 2C are cross-sectional diagrams showing aspects of an ink surface when supplying ink from a main tank to an ink holding section in the ink supply system.
Figure 2B:
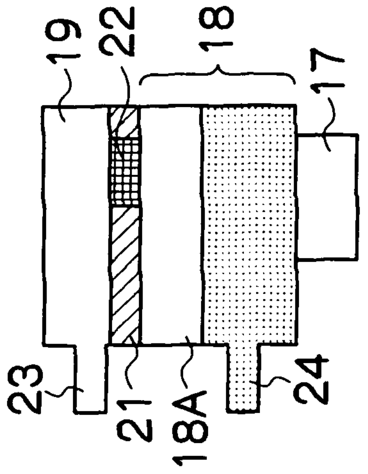
Figure 2C:
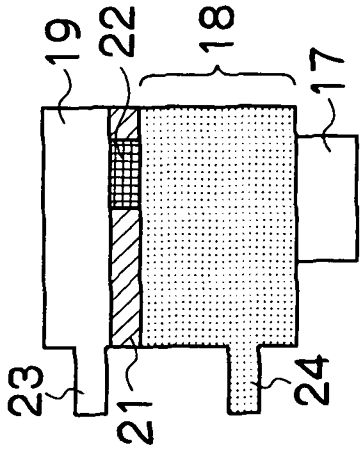

Functions of the ink supply system having the above-described composition are described with reference to FIG. 1 along with FIGS. 2A to 2C, which are cross-sectional diagrams showing the aspects of the surface of ink (i.e., the interface between the ink and the air) when ink is supplied from the main tank 13 to the ink holding section 18.

Firstly, if the remaining amount of ink in the ink holding section 18 inside the sub tank 11 has become low, then the head 17 moves from the scanning print region A1 to a maintenance region A2, and the sub tank 11 is coupled with the coupling unit 12. In this state, the joint 27 connected to the suction pump 16, which sucks air, couples with the suction port 23, and the joint 28 connected to the main tank 13 couples with the intake port 24.

Next, when the valves are opened and the suction pump 16 is driven for sucking air, the pressure in the air connection passage 19 is reduced through the joint 27 and the suction port 23. In this state, since the gas/liquid separating member 22 allows air to pass, the space region 18A above the surface of the ink (which ink is indicated by dots in the drawings) inside the ink holding section 18 shown in FIG. 2A assumes a reduced pressure state. Hence, ink is supplied to the ink holding section 18 from the main tank 13 through the joint 28 and the intake port 24. Thereby, the ink surface inside the ink holding section 18 rises as shown in FIG. 2B, and eventually a full state is reached where the ink surface makes contact with the gas/liquid separating member 22, as shown in FIG. 2C.

When the ink surface in the ink holding section 18 makes contact with the gas/liquid separating member 22, since the gas/liquid separating member 22 has a function for impeding the passage of liquid, then the rise in the ink surface is halted. The suctional force of the suction pump 16 is set to be lower than the liquid passage impeding force of the gas/liquid separating member 22.

The ink holding sections 18 are provided separately for the inks of the respective colors and are disposed in an alignment. It is possible that a single air connection channel 19 commonly serves the respective ink holding sections 18. In this case, when a suction operation is carried out by the suction pump 16, ink supply operations from the respective main tanks 13 are started simultaneously for the inks in the ink holding sections 18 of the respective colors. It is often the case that the remaining amounts of the inks are different between the ink holding sections 18 of the respective colors, but since the gas/liquid separating members 22 have the function that impedes the passage of liquid as described above, then the ink supply operations successively terminate as the ink holding sections 18 of the respective inks become full and the ink surfaces therein come into contact with the gas/liquid separating members 22.

Judgment Procedure of Judgment Unit

Figure 3:
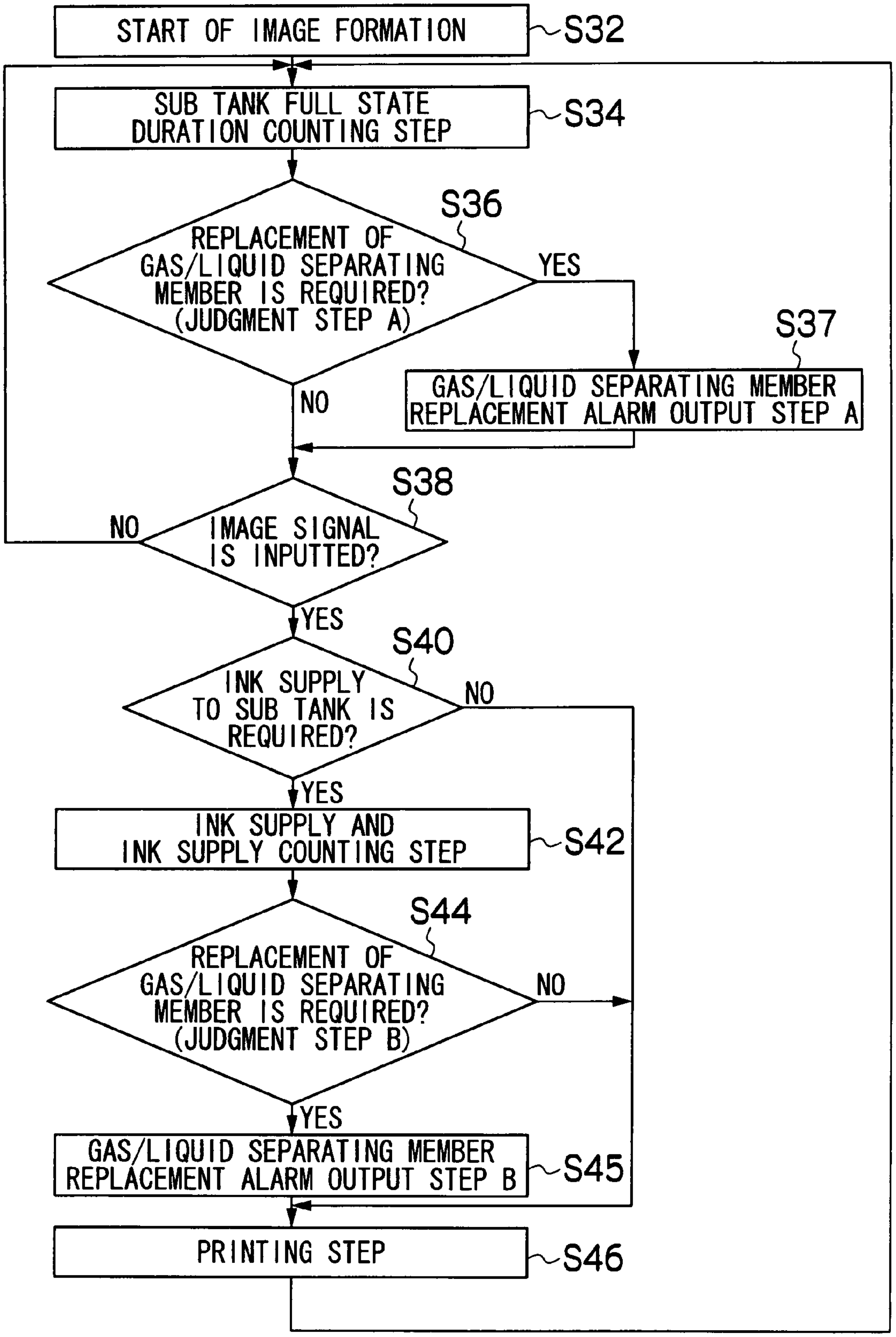
FIG. 3 is an illustrative diagram of a judgment process of a judgment device in the ink supply system.

With reference to FIG. 3, there follows a description of the details of a judgment carried out by a judgment unit 92 (see FIG. 8), which is one of the characteristic features of the present invention, when determining the replacement timing for the gas/liquid separating member 22 in the ink supply system of the present embodiment, which has the above-described functions.

As shown in FIG. 3, firstly, when image formation is started up (step S32), the procedure advances to a sub tank full state duration counting step S34, and measures a sub tank full state duration $T_c$, during which the ink surface is in contact with the gas/liquid separating member 22, with the ink holding section 18 inside the sub tank 11 in the full ink state.

Here, the step of counting the sub tank full state duration $T_c$ in step S34 is described in detail. In this step, the duration of the full state is measured for each of the sub tanks of the respective colors. More specifically, the valve control signal, a sensor, or the like, is used as a basis to determine the time point at which the valve is closed and the suction pump 16 is turned off, thereby halting the ink supply operation, after the ink holding section 18 inside the sub tank 11 has become full with ink and the ink surface has become in contact with the gas/liquid separating member 22. Then, an amount of ink having been consumed is calculated for each color in accordance with dot data (print data) having been supplied to a head driver 84 (see FIG. 8) for forming an image on a recording paper, and the change in the height of the surface of the ink of each color is determined on the basis of the consumed amount of ink thus calculated. Alternatively, it is also possible that an image having been formed on a recording paper is read through an image data acquisition unit 90 (see FIG. 8), dot data of the read image is thereby captured, an amount of ink having been consumed is calculated for each color from the captured dot data of the image having been formed, and the change in the height of the surface of the ink of each color is determined on the basis of the consumed amount of ink thus calculated. Alternatively, it is also possible that the height of the surface of the ink of each color is directly measured by means of an optical sensor (not shown), or the like.

On the basis of the determination results, if, among the ink holding sections 18 of the respective colors, there is the ink holding section 18 of the ink of color that has not been ejected for image printing and hence has continued in a full state since the previous ink supply operation, then particular consideration is given to the ink holding section 18 of this color. The contact duration between the ink surface and the gas/liquid separating member 22 since the time at which the current ink supply is completed in the ink holding section 18 of that color is added up, and the sub tank full state duration $T_c$ is calculated as the cumulative value of this contact duration. Here, the contact duration is calculated while regarding the ink full state as continuing from directly after the filling of the tank until the ink surface reaching a position corresponding to a prescribed amount of ink consumption. This is because, due to the surface tension of the ink, the ink surface continues in contact with the gas/liquid separating member 22 even after descending within a range of several millimeters.

Next, the procedure advances to a judgment step A of replacement requirement for the gas/liquid separating member 22 (step S36), and it is judged whether a replacement of the gas/liquid separating member 22 is required or not on the basis of the sub tank full state duration $T_c$ measured at step S34. More specifically, if the sub tank full state duration $T_c$ exceeds a threshold value $T_{th}$, it is then judged that replacement of the gas/liquid separating member 22 is necessary, and the procedure advances to a gas/liquid separating member replacement alarm output step A (step S37), where an alarm which indicates that the replacement time of the gas/liquid separating member 22 has been reached, is outputted to an alarm output unit 91 (see FIG. 8). The alarm may be outputted, for example, by being displayed on a display section of the operating unit of the image forming apparatus. Thereupon, the procedure advances to the following step, which is an image signal input judgment step S38. On the other hand, if the sub tank full state duration $T_c$ does not exceed the threshold value $T_{th}$ at step S36, it is then judged that no replacement of the gas/liquid separating member 22 is necessary, and the procedure advances directly to the image signal input judgment step S38.

Here, the threshold value $T_{th}$ of the sub tank full state duration in the gas/liquid separating member replacement requirement judgment step A in step S36 is described. In this step, the threshold value $T_{th}$ of the sub tank full state duration $T_c$ is expressed as:

$$T_{th}=(k_1\times\gamma^i)/d^j,$$

where $k_1$ is a constant that is set in accordance with the material of the gas/liquid separating member 22, the type of ink, the performance of the suction pump 16, and the like, γ is the surface tension of the ink, d is the size of the pigment particles, which are insoluble particles dispersed in the ink, and i and j are arbitrary values based on experimental values, and the like. Here, reference to pigment particles of particle size d means that the particle size frequency of particles having the diameters not smaller than d nanometers is not more than 2 vol % of the whole pigment particles.

The reason for considering the surface tension γ in the calculation of the threshold value $T_{th}$ is that the durable lifetime of the gas/liquid separating member 22 varies with difference in the surface tensions of the inks of the respective colors. More specifically, in the case of an ink that has low surface tension, the ink permeates into the fine apertures of the gas/liquid separating member 22, and the durable lifespan of the gas/liquid separating member 22 becomes shorter. Hence, in the equation described above, the greater the surface tension γ, the greater the threshold value $T_{th}$ set for the sub tank full state duration $T_c$.

The reason for considering the particle size d of the pigment particles in the calculation of the threshold value $T_{th}$ is that the durable lifespan of the gas/liquid separating member 22 varies with difference in the dispersed particle sizes in the pigment-based inks. More specifically, the greater the dispersed particle size in the pigment-based ink, the greater the amount of obstruction caused by blockages when the ink permeates into the fine apertures of the gas/liquid separating member 22. Hence, in the equation described above, the greater the particle size d of the pigment particles, the smaller the threshold value $T_{th}$ set for the sub tank full state duration $T_c$.

Next, the procedure advances to an image signal input judgment step S38, and it is judged whether image dot data for one sheet of recording paper has been inputted. If it is not judged that image dot data for one sheet of recording paper has been inputted, then the procedure returns to the sub tank full state duration counting step in step S34, and measures the sub tank full state duration $T_c$. If, on the other hand, it is judged that image dot data for one sheet of recording paper has been inputted, then the procedure advances to a sub tank remaining amount judgment step S40, where the remaining amount of ink in the ink holding section 18 inside the sub tank 11 is measured, and it is judged whether or not the supply of ink is required. As a judgment reference for requirement or non-requirement of ink supply, it is judged whether or not the remaining amount of ink is sufficient to record one sheet of recording paper.

If the amount of ink corresponding to one sheet of recording paper is remaining in the ink holding section 18 of every color, then it is judged that supply of ink is not necessary and the procedure advances to a printing step (step S46).

If, on the other hand, the amount of ink corresponding to one sheet of recording paper is not remaining in at least any one of the ink holding sections 18 of the colors, then it is judged that supply of ink is necessary, and the procedure advances to an ink supply and ink supply counting step (step S42). In step S42, ink supply is carried out, and when the ink surface comes into contact with the gas/liquid separating member 22, thus reaching the full state, then since the gas/liquid separating member 22 has the function of impeding the passage of liquid, the rise in the ink surface halts and ink supply from the main tank 13 also halts. In this case, the number of times that the ink surface makes contact with the gas/liquid separating member 22 is counted, and the cumulative value of this count is taken as a number of ink supply operations $C_p$.

The procedure then advances to a judgment step B of replacement requirement for the gas/liquid separating member 22 (step S44), and it is judged whether a replacement of the gas/liquid separating member 22 is required or not on the basis of the number of ink supply operations $C_p$. More specifically, if the number of ink supply operations $C_p$ exceeds a threshold value $C_{th}$, it is then judged that replacement of the gas/liquid separating member 22 is necessary, and the procedure advances to a gas/liquid separating member replacement alarm output step B (step S45), where an alarm which indicates that the replacement time of the gas/liquid separating member 22 has been reached, is outputted. The alarm may be outputted, for example, by being displayed on the display section of the operating unit of the image forming apparatus. Thereupon, the procedure advances to the following step, which is the printing step (step S46). On the other hand, if the number of ink supply operations $C_p$ does not exceed the threshold value $C_{th}$ at step S44, it is then judged that no replacement of the gas/liquid separating member 22 is necessary, and the procedure advances directly to the next step, which is the printing step (step S46).

Here, the threshold value $C_{th}$ of the number of ink supply operations in the gas/liquid separating member replacement requirement judgment step B in step S44 is described. In this step, the threshold value $C_{th}$ of the number of ink supply operations $C_p$ is expressed as:

$$C_{th}=(k_2\times\gamma^n)/d^m,$$

where $k_2$ is a constant that is set in accordance with the material of the gas/liquid separating member 22, the type of ink, the performance of the suction pump 16, and the like, γ is the surface tension of the ink, d is the size of the pigment particles, which are insoluble particles dispersed in the ink, and m and n are arbitrary values based on experimental values, or the like.

The reason for considering the surface tension γ in the calculation of the threshold value $C_{th}$ is that the durable lifespan of the gas/liquid separating member 22 varies with difference in the surface tensions of the inks of the respective colors. More specifically, in the case of an ink that has low surface tension, the ink permeates into the fine apertures of the gas/liquid separating member 22, and the durable lifespan of the gas/liquid separating member 22 becomes shorter. Hence, in the equation described above, the greater the surface tension γ, the greater the threshold value $C_{th}$ set for the number of ink supply operations $C_p$.

The reason for considering the particle size d of the pigment particles in the calculation of the threshold value $C_{th}$ is that the durable lifespan of the gas/liquid separating member 22 varies with difference in the dispersed particle size in the pigment-based ink. More specifically, the greater the dispersed particle size in the pigment-based ink, the greater the amount of obstruction caused by blockages when the ink permeates into the fine apertures of the gas/liquid separating member 22. Hence, in the equation described above, the greater the particle size d of the pigment particles, the smaller the threshold value $C_{th}$ set for the number of ink supply operations $C_p$.

In the next step, which is the printing step S46, an image corresponding to one sheet of recording paper is printed. Thereupon, the procedure returns to the sub tank full state duration counting step S34, and repeats the steps described above.

In this way, according to the present embodiment, the requirement for replacement of the gas/liquid separating member 22 is judged on the basis of the sub tank full state duration $T_c$ and the number of ink supply operations $C_p$, which indicate the state of contact between the ink surface inside the ink holding section 18 and the gas/liquid separating member 22, and therefore, it is possible to accurately determine the replacement time for the gas/liquid separating member 22. Consequently, by replacing the gas/liquid separating member 22 with a new one, at the determined replacement time, it is possible to prevent problems, such as decline in the functional performance of the gas/liquid separating member 22.

Description of Print Unit

Figure 4:
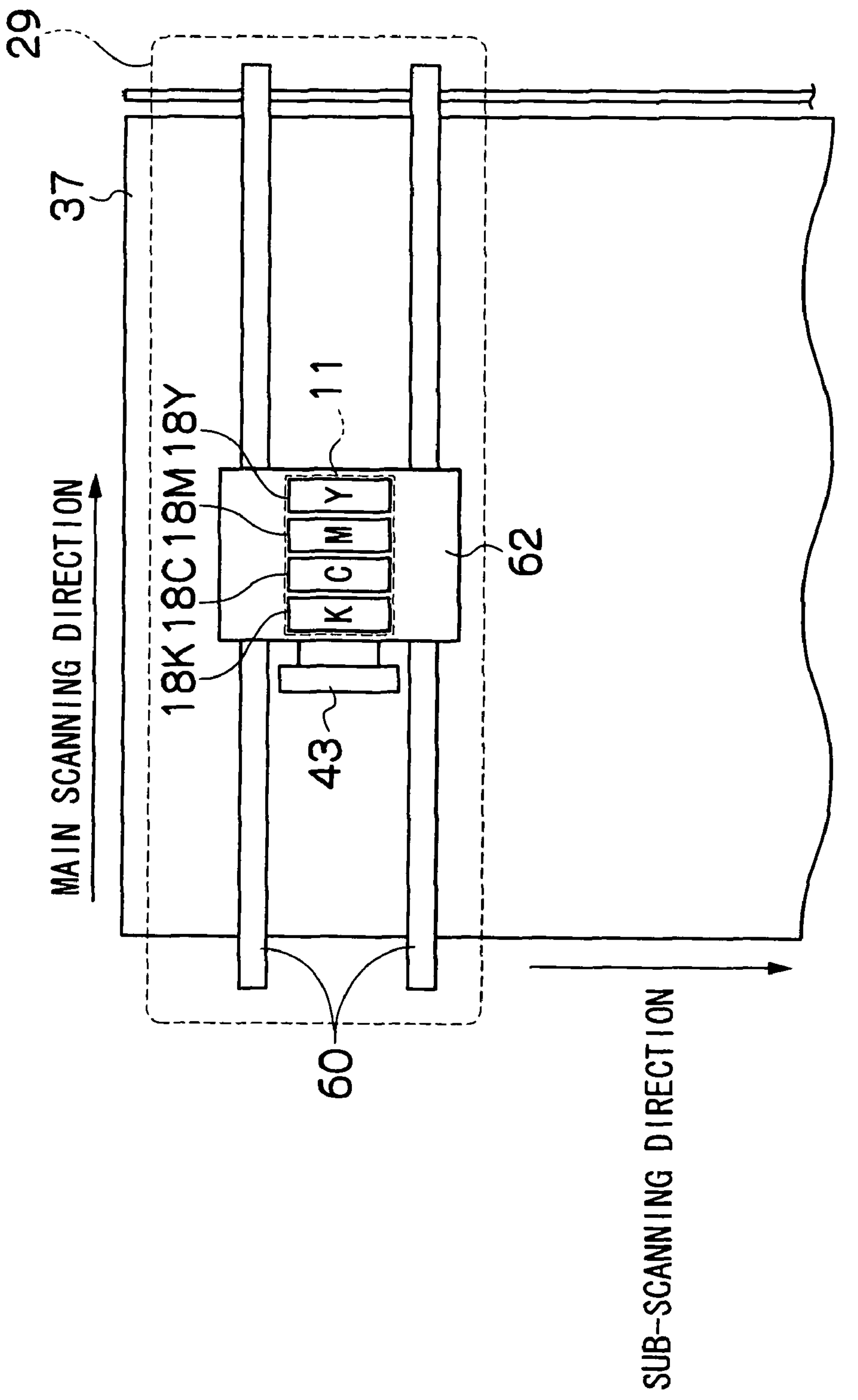
FIG. 4 is a principal plan diagram showing the peripheral area of a print unit of an inkjet recording apparatus according to an embodiment of the present invention.

Next, a print unit including the above-described ink supply system is described. FIG. 4 is a principal plan diagram showing the periphery of the print unit 29 of an inkjet recording apparatus 10 according to an embodiment of the image forming apparatus of the present invention. The print unit 29 is provided with a carriage 62, which is movable reciprocally along two guide rails 60 extending in the breadthways direction of recording paper 37 (the main scanning direction). The sub tank 11 having ink holding sections (18K, 18C, 18M and 18Y) corresponding to the inks of the respective colors of black (K), cyan (C), magenta (M) and yellow (Y), and a print determination unit (scanner unit) 43 are detachably mounted on the carriage 62, in such a manner that they can scan the recording paper 37 in the main scanning direction with the carriage 62.

Although the configuration with the four standard colors, K, C, M and Y, is described in the present embodiment, the combinations of the ink colors and the number of colors are not limited to these, and light and/or dark inks can be added as required. For example, a configuration is possible in which sub tanks having heads for ejecting light-colored inks, such as light cyan and light magenta, are added.

The print determination unit 43 includes sensors (not shown) for capturing recorded images, and it functions as a device for reading in a test pattern recorded by the head 17 integrated with the sub tank 11 and thereby checking the ink ejection state of the head 17. It is possible that the print determination unit 43 also serves as the image data acquisition unit 90.

Figure 5:
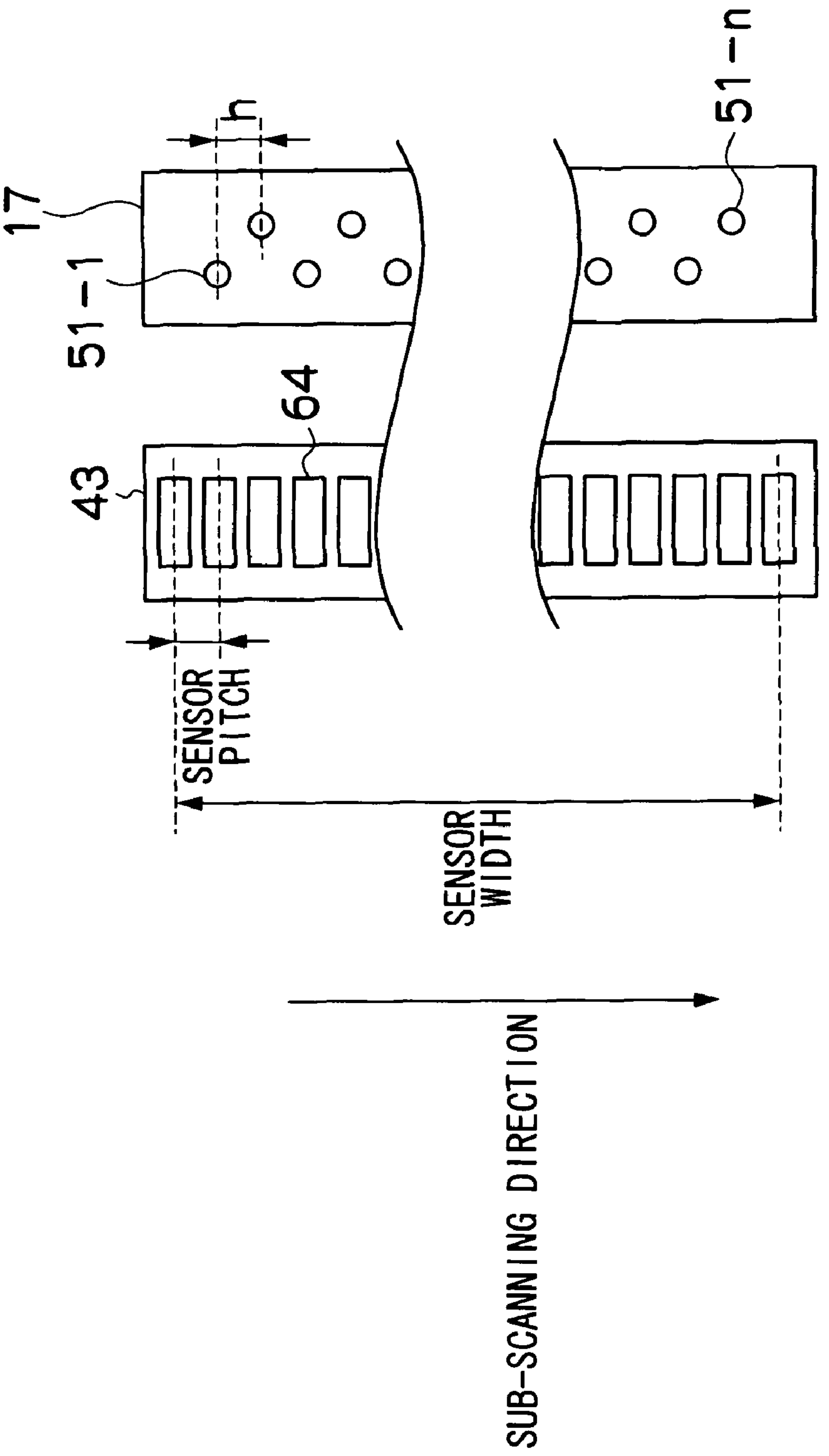
FIG. 5 is an illustrative diagram showing a nozzle face of a print head and a sensor face of a print determination unit in the inkjet recording apparatus.

FIG. 5 is an illustrative diagram showing a nozzle face of the head 17 and a sensor face of the print determination unit 43. As shown in FIG. 5, a plurality of nozzles 51 are arranged in a staggered matrix fashion in the head 17, and the nozzle density (nozzle pitch h) in the sub-scanning direction is 1200 nozzles per inch. The recording resolution (dot pitch) in the inkjet recording apparatus 10 according to the present embodiment is 1200 dots per inch (dpi) in both the sub-scanning direction and the main scanning direction.

The nozzle pitch h in the staggered nozzle arrangement shown in FIG. 5 is the nozzle pitch (the distance between the centers of the nozzles) in a projected nozzle row, which is obtained by projecting the respective nozzles 51 to an alignment in the sub-scanning direction.

The present embodiment relates to the mode where the nozzles 51 are disposed in the staggered matrix configuration, but it is also possible to adopt nozzle arrangements other than the staggered matrix configuration, such as a mode where the nozzles 51 are aligned in one row following the sub-scanning direction, and a mode where the nozzles 51 are arranged two-dimensionally (a mode where the nozzles are arranged following a row direction in line with the sub-scanning direction, and a column direction having a prescribed oblique angle with respect to the sub-scanning direction), or the like.

A plurality of sensors 64 are arranged in a line configuration (a one-dimensional configuration) on the sensor face of the print determination unit 43. The sensor density (sensor pitch) in the sub-scanning direction is the same as the nozzle density of the head 17 (1200 sensors per inch), and the reading resolution of the print determination section 43 is 1200 dpi.

The sensor width (reading width) of the print determination unit 43 is set to be broader than the nozzle width (printing width) of the head 17. Accordingly, even if relative positional error occurs between the head 17 and the print determination unit 43 mounted on the carriage 62 (see FIG. 4), the print determination unit 43 is able to reliably read the test pattern formed by the head 17.

Figure 6A:
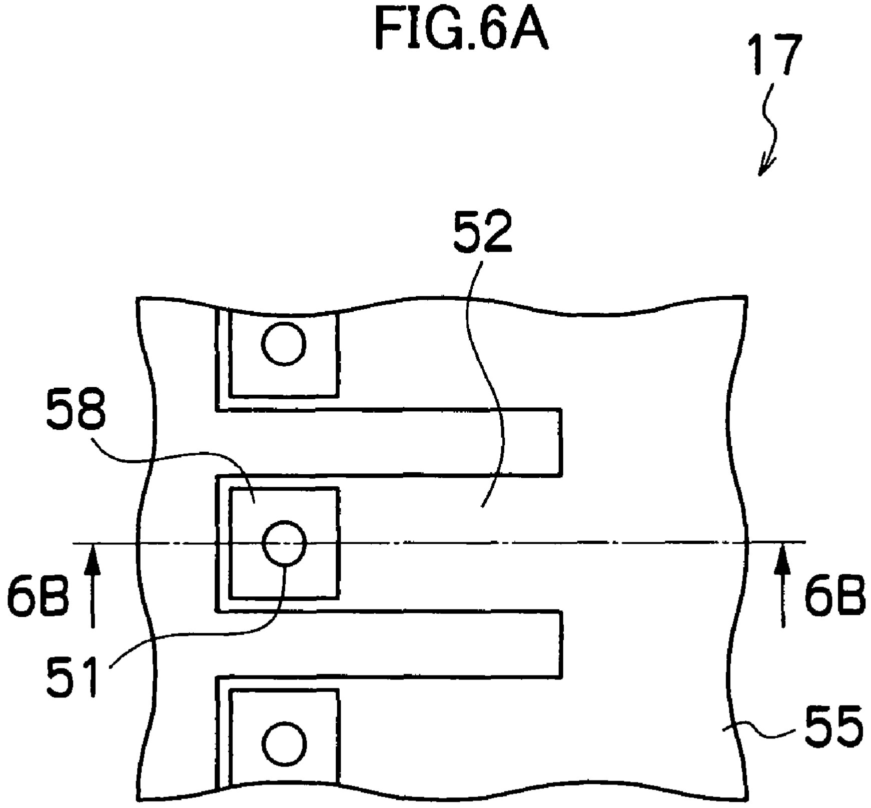
FIGS. 6A and 6B are schematic drawings of the internal structure of the print head.
Figure 6B:
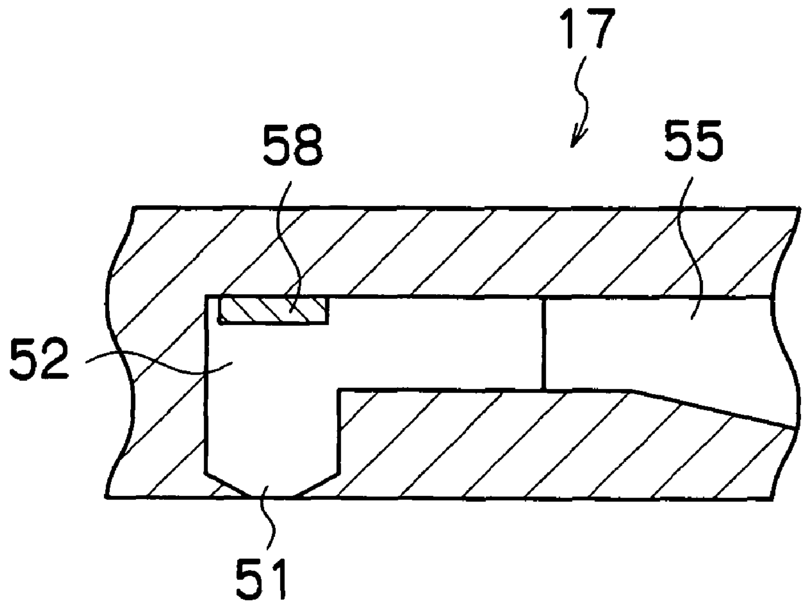

FIGS. 6A and 6B are schematic drawings showing the internal structure of the head 17, and FIG. 6A is a plan view perspective diagram showing a portion of the head 17, and FIG. 6B is a cross-sectional diagram along line 6B-6B in FIG. 6A. In the head 17, individual flow channels 52 are arranged so as to correspond respectively to the nozzles 51. A heating element 58 is arranged on a side wall of each of the individual flow channels 52, to form an ejection device for ejecting ink droplets from each of the nozzles 51. In the present embodiment, the heating element 58 is disposed on the wall opposing the nozzle 51. The individual flow channels 52 are connected to a common flow channel 55. Ink supplied from the ink holding section 18 is accumulated in the common flow channel 55, and the ink is distributed and supplied to the respective individual flow channels 52 from the common flow channel 55.

According to this composition, when a prescribed drive voltage is supplied to the heating element 58, a bubble grows in the ink inside the individual flow channel 52, due to the heat generated by the heating element 58, and an ink droplet is ejected from the nozzle 51 by the pressure created by this bubble. After ink ejection, further ink is supplied from the common flow channel 55 to the individual flow channel 52.

General Composition of Inkjet Recording Apparatus

Figure 7:
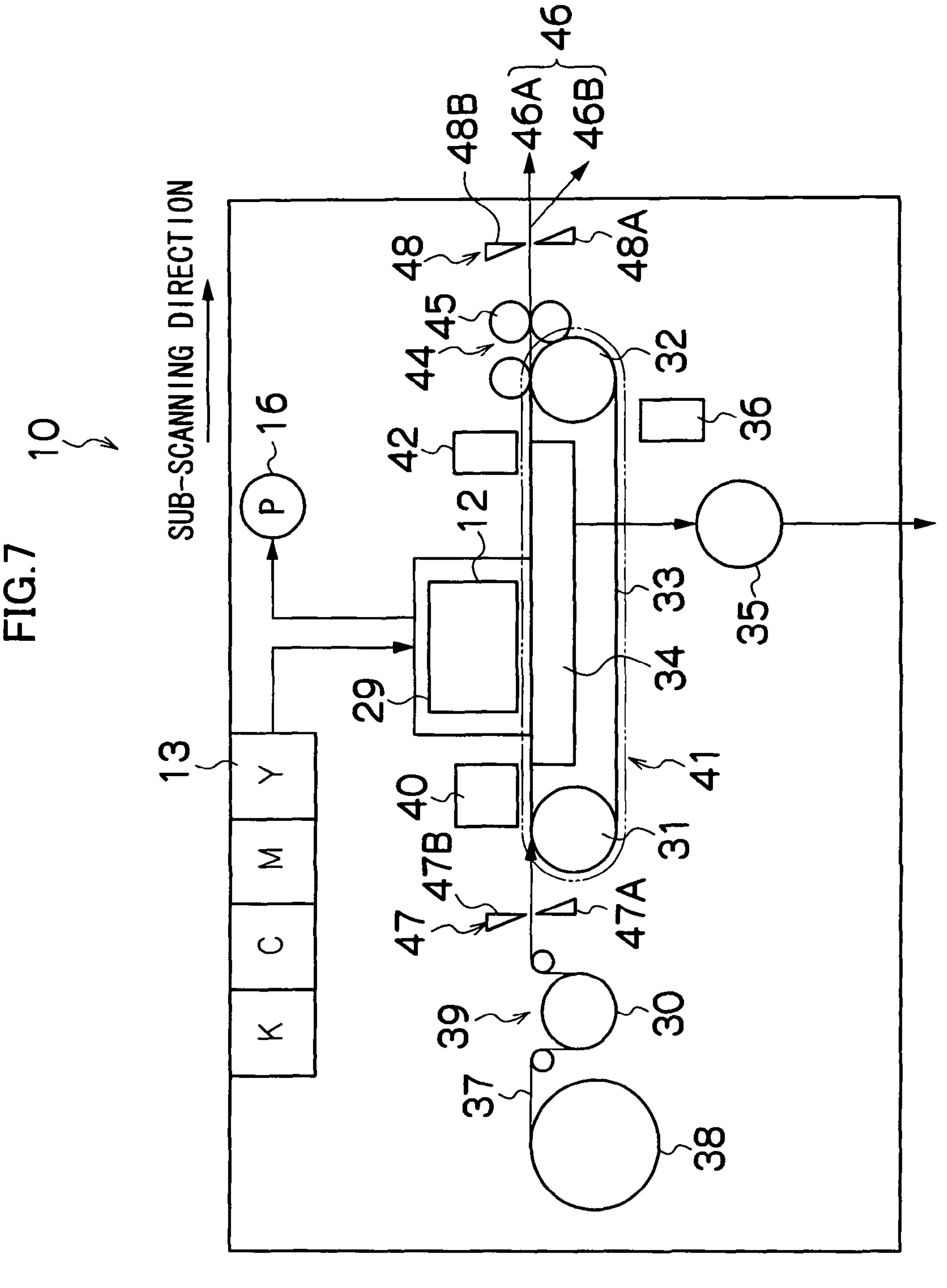
FIG. 7 is a general schematic drawing of the inkjet recording apparatus.

FIG. 7 is a general schematic drawing of the inkjet recording apparatus 10 having the above-described print unit 29. The inkjet recording apparatus 10 includes: the print unit 29 having the sub tanks 11 having the ink holding sections (18K, 18C, 18M and 18Y) corresponding to the inks of the respective colors; the main tank 13, which stores inks for supply to the respective ink holding sections (18K, 18C, 18M and 18Y); the coupling unit 12, which couples with the print unit 29 when the inks are supplied to the respective ink holding sections (18K, 18C, 18M and 18Y); the suction pump 16, which is connected to the coupling unit 12; a paper supply unit 38, which supplies the recording paper 37; a decurling unit 39, which removes curl from the recording paper 37; a suction belt conveyance unit 41, which is disposed opposing the nozzle face (ink ejection face) of the print unit 29 and conveys the recording paper 37 while holding the recording paper 37 flat; the print determination unit 43, which reads in the print results of the print unit 29; and a paper output unit 46, which outputs printed recording paper (printed matter) to the exterior.

In FIG. 7, a magazine for rolled paper (continuous paper) is shown as an embodiment of the paper supply unit 38; however, a plurality of magazines with papers of different paper width and quality may be jointly provided. Moreover, papers may be supplied in cassettes which contain cut papers loaded in layers and which are used jointly or in lieu of magazines for rolled papers.

In the case of the configuration in which roll paper is used, a cutter 47 is provided as shown in FIG. 7, and the roll paper is cut to a desired size by the cutter 47. The cutter 47 has a stationary blade 47A, whose length is not less than the width of the conveyor pathway of the recording paper 37, and a round blade 47B, which moves along the stationary blade 47A. The stationary blade 47A is disposed on the reverse side of the printed surface of the recording paper 37, and the round blade 47B is disposed on the printed surface side across the conveyance path. When cut paper is used, the cutter 47 is not required.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 37 delivered from the paper supply unit 38 retains curl due to having been loaded in the magazine. In order to remove the curl, heat is applied to the recording paper 37 in the decurling unit 39 by a heating drum 30 in the direction opposite from the curl direction in the magazine. The heating temperature at this time is preferably controlled so that the recording paper 37 has a curl in which the surface on which the print is to be made is slightly round outward.

The decurled and cut recording paper 37 is delivered to the suction belt conveyance unit 41. The suction belt conveyance unit 41 has a configuration in which an endless belt 33 is set around rollers 31 and 32 so that the portion of the endless belt 33 facing at least the nozzle face of the printing unit 29 forms a plane.

The belt 33 has a width that is greater than the width of the recording paper 37, and a plurality of suction apertures (not shown) are formed on the belt surface. A suction chamber 34 is disposed in a position facing the nozzle face of the printing unit 29 on the interior side of the belt 33, which is set around the rollers 31 and 32, as shown in FIG. 7. The suction chamber 34 provides suction with a fan 35 to generate a negative pressure, and the recording paper 37 on the belt 33 is held by suction. In the area of the printing unit 29, the head 17 integrated with the sub tank 11 performs reciprocating scanning in the direction perpendicular to the sheet of drawing in FIG. 7.

The belt 33 is driven in the clockwise direction in FIG. 7 by the motive force of a motor 88 (see FIG. 8) being transmitted to at least one of the rollers 31 and 32, which the belt 33 is set around, and the recording paper 37 held on the belt 33 is conveyed in the sub-scanning direction (the paper conveyance direction) in FIG. 7.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, embodiments thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning rollers different than that of the belt 33 to improve the cleaning effect.

The inkjet recording apparatus 10 can have a roller nip conveyance mechanism, instead of the suction belt conveyance unit 41. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 29 in the conveyance pathway formed by the suction belt conveyance unit 41. The heating fan 40 blows heated air onto the recording paper 37 to heat the recording paper 37 immediately before printing so that the ink deposited on the recording paper 37 dries more easily.

The main tank 13 includes tanks that store inks of the colors of the head 17 corresponding to the respective ink holding sections (18K, 18C, 18M and 18Y) of the print unit 29 (see FIG. 4). Moreover, the main tank 13 also has a notifying device (display device, alarm generating device, or the like) for generating a notification if the remaining amount of ink has become low, as well as having a mechanism for preventing incorrect loading of ink of the wrong color.

The coupling unit 12 is arranged on the print unit 29 in the main scanning direction. If the remaining amount of ink in the ink holding section 18 inside the sub tank 11 has become low, then the head 17 moves from the scanning print region A1 to the maintenance region A2, and the sub tank 11 is coupled with the coupling unit 12 (see FIG. 1). In this state, inks are supplied to the respective ink holding sections (18K, 18C, 18M and 18Y) through the coupling unit 12 from the main tank 13.

A post-drying unit 42 is disposed following the print unit 29. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 46. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 46A and 46B, respectively. When the target print and the test print are simultaneously formed in parallel on the same large sheet of paper, the test print portion is cut and separated by a cutter (second cutter) 48. The cutter 48 is disposed directly in front of the paper output unit 46, and is used for cutting the test print portion from the target print portion when a test print has been performed in the blank portion of the target print. The structure of the cutter 48 is the same as the first cutter 47 described above, and has a stationary blade 48A and a round blade 48B.

Although not shown in drawings, the paper output unit 46A for the target prints is provided with a sorter for collecting prints according to print orders.

Description of Control System

Figure 8:
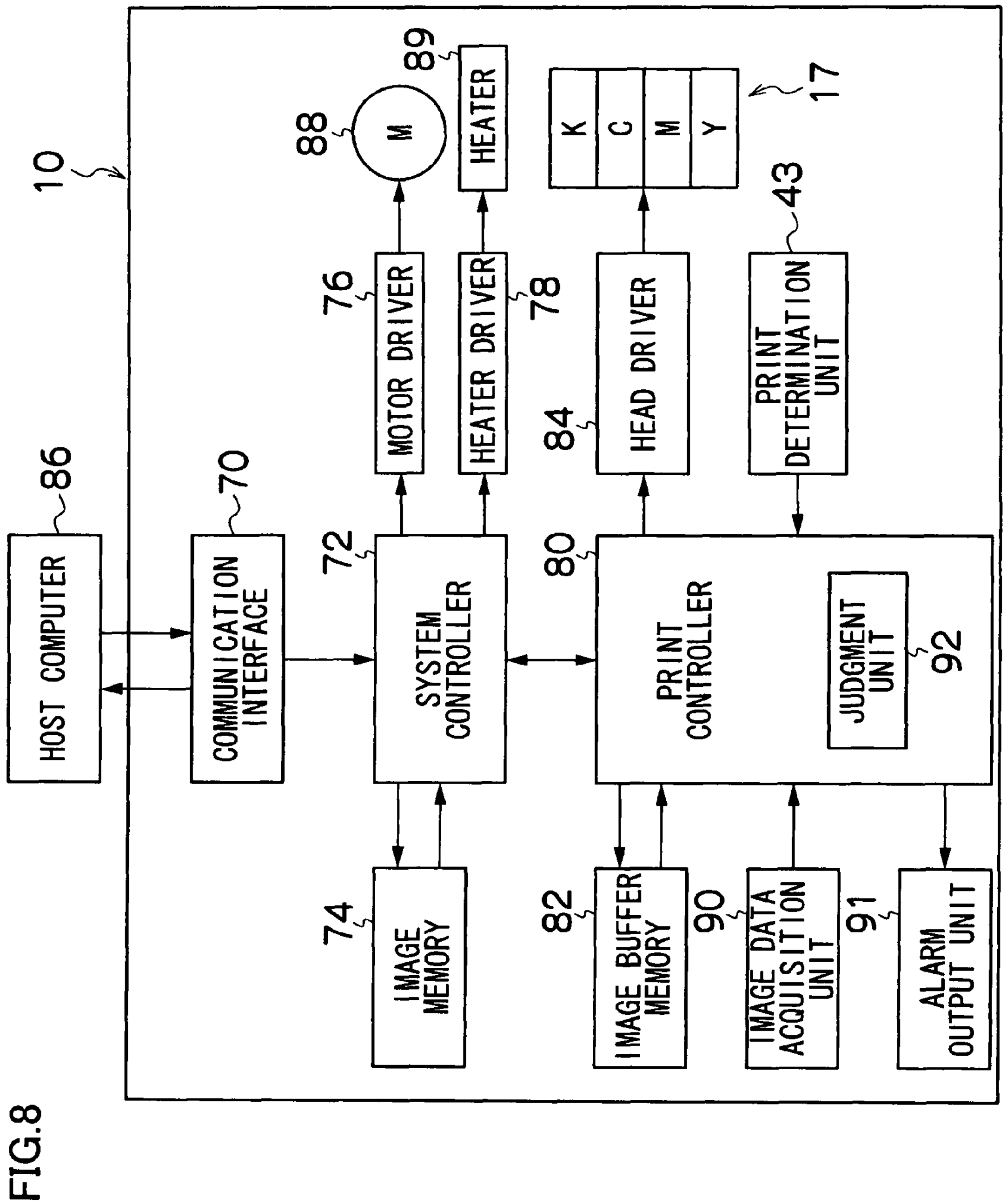
FIG. 8 is a principal block diagram showing a system composition of the inkjet recording apparatus.
Figure 9:
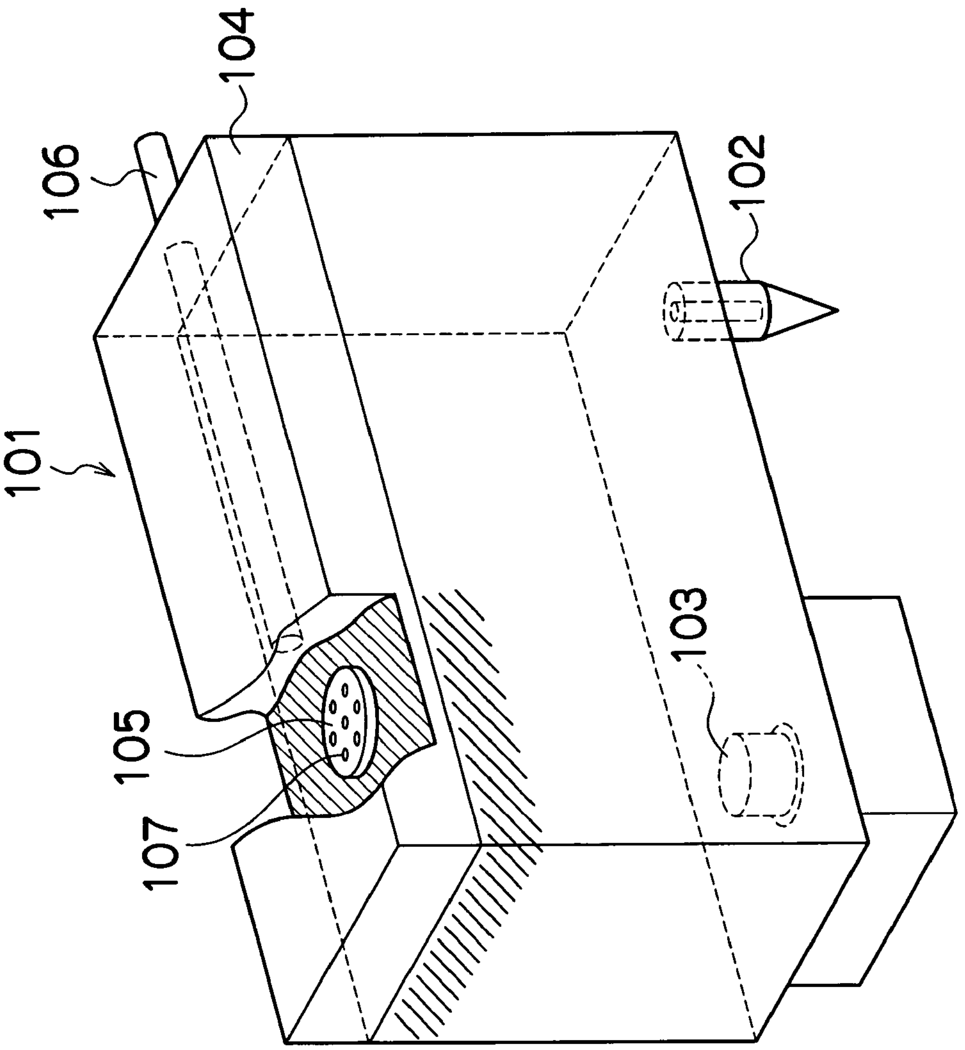
FIG.9 RELATED ART
FIG. 9 is an approximate oblique drawing of a sub tank which forms a liquid holding vessel in the related art.

FIG. 8 is a principal block diagram showing the system configuration of the inkjet recording apparatus 10. The inkjet recording apparatus 10 includes a communication interface 70, a system controller 72, an image memory 74, a motor driver 76, a heater driver 78, a print controller 80, an image buffer memory 82, a head driver 84, and the like.

The communication interface 70 is an interface unit for receiving image data sent from a host computer 86. A serial interface or a parallel interface may be used as the communication interface 70. A buffer memory (not shown) may be mounted in this portion in order to increase the communication speed.

The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is a control unit for controlling the various sections, such as the communications interface 70, the image memory 74, the motor driver 76, the heater driver 78, and the like. The system controller 72 is constituted by a central processing unit (CPU) and peripheral circuits thereof, and the like, and in addition to controlling communications with the host computer 86 and controlling reading and writing from and to the image memory 74, or the like, it also generates a control signal for controlling the motor 88 of the conveyance system and the heater 89.

The motor driver (drive circuit) 76 drives the motor 88 in accordance with commands from the system controller 72. The heater driver (drive circuit) 78 drives the heater 89 of the post-drying unit 42 or other units in accordance with commands from the system controller 72.

The print controller 80 has a signal processing function for performing various tasks, compensations, and other types of processing for generating print control signals from the image data stored in the image memory 74 in accordance with commands from the system controller 72 so as to supply the generated print control signal (dot data) to the head driver 84. Prescribed signal processing is carried out in the print controller 80, and the ejection amount and the ejection timing of the ink droplets from the print head 17 are controlled through the head driver 84, on the basis of the print data. By this means, prescribed dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 8 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 generates drive signals for driving the heating elements 58 of the respective colors in the head 17 (see FIGS. 6A and 6B) on the basis of the print data supplied from the print controller 80, and supplies the drive signals thus generated to the heating elements 58. A feedback control system for maintaining constant drive conditions for the head 17 may be included in the head driver 84.

As stated previously, the print determination unit 43 reads in a test pattern recorded by the head 17, and performs prescribed signal processing, and the like, in order to determine the ink ejection status of the head 17 (the presence/absence of ejection, the dot sizes, dot depositing positions, and the like) (in other words, it determines variations in the respective nozzles 51). The print determination unit 43 supplies the determination results to the print controller 80. According to requirements, the print controller 80 makes various corrections with respect to the head 17 on the basis of information obtained from the print determination unit 43.

The image data acquisition unit 90 acquires the dot data of the image having been recorded by the head 17, and the acquired information is supplied to the print controller 80. By means of the judgment unit 92, the print controller 80 judges whether or not replacement of the gas/liquid separating member 22 is required, on the basis of the dot data that the print controller 80 has supplied to the head driver 84, or on the basis of the dot data obtained through the image data acquisition unit 90. If it is judged that replacement of the gas/liquid separating member 22 is necessary, then an output signal is supplied to the alarm output unit 91 and an alarm that reports the replacement time of the gas/liquid separating member 22 is outputted.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus, comprising:

a head which ejects droplets of liquid in accordance with an image signal;

a sub tank which is integrated with the head;

a liquid holding chamber which is arranged in the sub tank and has an intake port and an outflow port, the liquid being supplied to the liquid holding chamber through the intake port and supplied to the head through the outflow port;

an air connection channel which is arranged in the sub tank above the liquid holding chamber and has a suction port through which air is sucked;

a dividing plate which is arranged in the sub tank on an upper face of the liquid holding chamber and beneath the air connection channel, divides the liquid holding chamber from the air connection channel, and defines an upper limit of a surface of the liquid held in the liquid holding chamber;

a gas/liquid separating member which is disposed in a portion of the dividing plate and allows only air to pass between the liquid holding chamber and the air connection channel, the surface of the liquid being in contact with the gas/liquid separating member when the sub tank is filled with the liquid;

a supply connection device which is capable of connecting with the intake port and the suction port;

a liquid holding tank which is connected to the supply connection device and capable of communicating with the liquid holding chamber through the intake port;

a suction device which is connected to the supply connection device and capable of communicating with the air connection channel through the suction port;

a measurement device which measures a sub tank full state duration as a duration of contact between the surface of the liquid and the gas/liquid separating member; and a judgment device which makes a judgment that replacement of the gas/liquid separating member is required in accordance with a comparison between a cumulative value of the duration of contact measured by the measurement device and a contact duration threshold value.

2. The image forming apparatus as defined in claim 1, wherein the judgment device makes the judgment while taking account of at least one of a surface tension of the liquid and a particle diameter of insoluble particles dispersed in the liquid.

3. The image forming apparatus as defined in claim 2, wherein the liquid includes inks of colors, and the judgment device makes the judgment for each of the inks.

4. The image forming apparatus as defined in claim 1, wherein:

when the image signal is not inputted, the judgment device makes the judgment repeatedly in a predetermined cycle; and when the image signal is inputted, the judgment device makes the judgment after the head ejects droplets of the liquid in accordance with the inputted image signal.

5. The image forming apparatus as defined in claim 2, wherein:

the judgment device makes the judgment while taking account of the surface tension of the liquid; and the greater the surface tension is, the greater the contact duration threshold value is set.

6. The image forming apparatus as defined in claim 2, wherein:

the judgment device makes the judgment while taking account of the particle diameter of insoluble particles dispersed in the liquid; and the greater the particle diameter is, the smaller the contact duration threshold value is set.

7. The image forming apparatus as defined in claim 2, wherein:

the judgment device makes the judgment while taking account of the surface tension of the liquid and the particle diameter of insoluble particles dispersed in the liquid;

the greater the surface tension is, the greater the contact duration threshold value is set; and the greater the particle diameter is, the smaller the contact duration threshold value is set.

8. The image forming apparatus as defined in claim 7, wherein the contact duration threshold value is defined as $T_{th}$ in the following equation:

$$T_{th}=(k_1\times\gamma^i)/d^j,$$

where $k_1$ is a constant, γ is the surface tension, d is the particle diameter, and i and j are arbitrary values.

9. An image forming apparatus, comprising:

a head which ejects droplets of liquid in accordance with an image signal;

a sub tank which is integrated with the head;

a liquid holding chamber which is arranged in the sub tank and has an intake port and an outflow port, the liquid being supplied to the liquid holding chamber through the intake port and supplied to the head through the outflow port;

an air connection channel which is arranged in the sub tank above the liquid holding chamber and has a suction port through which air is sucked;

a dividing plate which is arranged in the sub tank on an upper face of the liquid holding chamber and beneath the air connection channel, divides the liquid holding chamber from the air connection channel, and defines an upper limit of a surface of the liquid held in the liquid holding chamber;

a gas/liquid separating member which is disposed in a portion of the dividing plate and allows only air to pass between the liquid holding chamber and the air connection channel, the surface of the liquid becoming in contact with the gas/liquid separating member when the sub tank becomes filled with the liquid by each of liquid supply operations;

a supply connection device which is capable of connecting with the intake port and the suction port;

a liquid holding tank which is connected to the supply connection device and capable of communicating with the liquid holding chamber through the intake port;

a suction device which is connected to the supply connection device and capable of communicating with the air connection channel through the suction port;

a counting device which counts a number of the liquid supply operations as a number of occurrences of contact between the surface of the liquid and the gas/liquid separating member; and a judgment device which makes a judgment that replacement of the gas/liquid separating member is required in accordance with a comparison between the number of occurrences of the contact counted by the counting device and a contact occurrence threshold number.

10. The image forming apparatus as defined in claim 9, wherein the liquid includes inks of colors, and the judgment device makes the judgment for each of the inks.

11. The image forming apparatus as defined in claim 9, wherein the judgment device makes the judgment each time the sub tank becomes filled with the liquid by each of the liquid supply operations.

12. The image forming apparatus as defined in claim 9, wherein the judgment device makes the judgment while taking account of at least one of a surface tension of the liquid and a particle diameter of insoluble particles dispersed in the liquid.

13. The image forming apparatus as defined in claim 12, wherein:

the judgment device makes the judgment while taking account of the surface tension of the liquid; and the greater the surface tension is, the greater the contact occurrence threshold number is set.

14. The image forming apparatus as defined in claim 12, wherein:

the judgment device makes the judgment while taking account of the particle diameter of insoluble particles dispersed in the liquid; and the greater the particle diameter is, the smaller the contact occurrence threshold number is set.

15. The image forming apparatus as defined in claim 12, wherein:

the judgment device makes the judgment while taking account of the surface tension of the liquid and the particle diameter of insoluble particles dispersed in the liquid;

the greater the surface tension is, the greater the contact occurrence threshold number is set; and the greater the particle diameter is, the smaller the contact occurrence threshold number is set.

16. The image forming apparatus as defined in claim 15, wherein the contact occurrence threshold number is defined as $C_{th}$ in the following equation:

$$C_{th}=(k_2\times\gamma^n)/d^m,$$

where $k_2$ is a constant, $\gamma$ is the surface tension, d is the particle diameter, and n and m are arbitrary values.

* * * * *